(No Model.)
L. N. STELY.
VEHICLE AXLE SUPPORT.
No. 496,285. Patented Apr. 25, 1893.
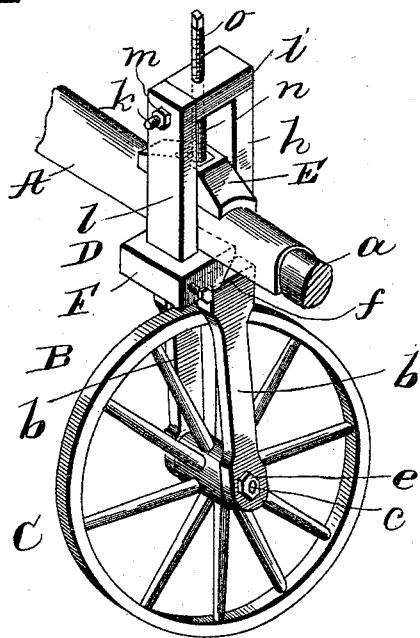
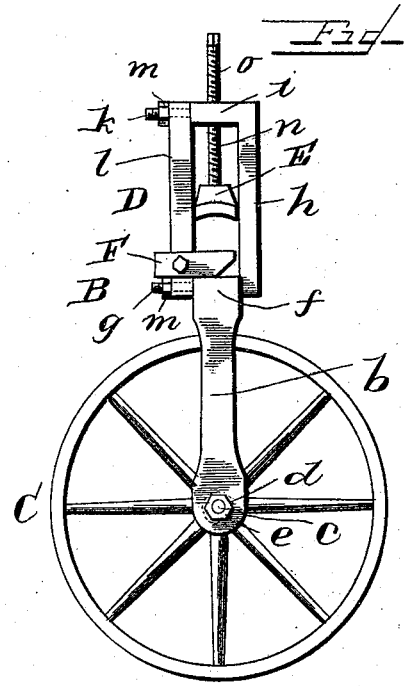
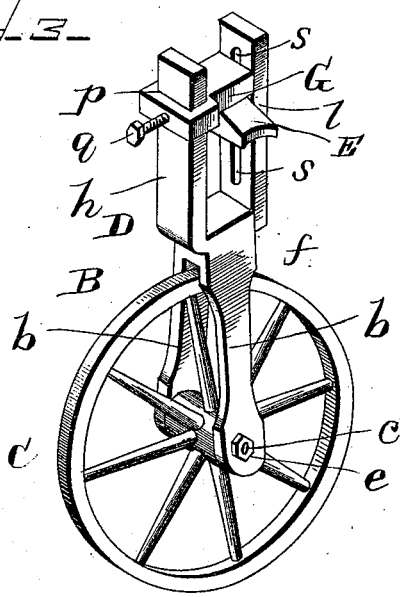
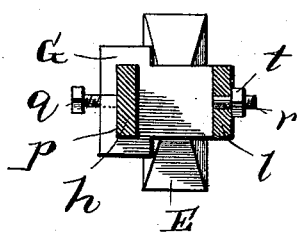
Witnesses
G. A. Tauberschmidt
H. B. Reinohl
Inventor
Levi Newton Stely
By D. I. Reinohl
Attorney

UNITED STATES PATENT OFFICE.

LEVI NEWTON STELY, OF VIENNA, VIRGINIA.

VEHICLE-AXLE SUPPORT.

SPECIFICATION forming part of Letters Patent No. 496,285, dated April 25, 1893.

Application filed August 20, 1892. Serial No. 443,603. (No model.)

*To all whom it may concern:*

Be it known that I, LEVI NEWTON STELY, a citizen of the United States, residing at Vienna, in the county of Fairfax and State of Virginia, have invented certain new and useful Improvements in Vehicle-Axle Supports; and I do hereby declare the following to be a full, clear, and exact description of the invention, such as will enable others skilled in the art to which it appertains to make and use the same.

My present invention relates to vehicles, and has for its object the construction of a device for supporting an axle in the event of the spindle or the wheel breaking, so that the vehicle can be drawn to the desired destination or to a shop for repairs without imposing additional work upon the animal drawing the vehicle or inconvenience to the occupant of the vehicle.

The invention will be fully disclosed in the following specification and claims.

In the accompanying drawings which form part of this specification, Figure 1, represents a perspective of my invention applied to the outer end of a broken vehicle axle; Fig. 2, an end view of the device detached from the axle; Fig. 3, a perspective of a modification of the clip, and Fig. 4, a top plan view of the upper clamping plate.

Reference being had to the drawings and the letters thereon, A indicates a vehicle axle having the spindle $a$ broken, B the device for supporting the axle, and consists of a frame provided with two vertical arms $b\ b$, the lower ends of which engage a spindle $c$ which passes through the hub of a supplemental wheel C, and is provided with a head $d$ and nut $e$.

At the upper end of the arms $b\ b$ is a clip D composed of a horizontal bottom plate $f$ having a screw threaded extension $g$ a vertical bar $h$ connected to the bottom $f$, a horizontal top plate $i$ connected to bar $h$, also provided with a screw-threaded extension $k$ and a detachable and laterally adjustable clamping-plate $l$, which engages the extensions $g$ and $k$ and is secured therein by nuts $m\ m$.

E indicates a clamp, pivotally secured to the lower end of a rod $n$ to admit of adjustment thereon to accommodate itself to the inclination of the upper surface of the axle, and is forced down upon the axle by the screw-threaded upper portion $o$ of the rod, which screw-threads engage a corresponding thread in the plate $i$.

F indicates a raising-block vertically adjustable upon the clamping-plate $l$, for the purpose of raising the axle to the proper height, should the distance between the bottom of the clip D and the ground be less than is necessary to level the axle. This construction is especially adapted for use on spring vehicles where there is room above the axle to operate the rod $n$ to apply the clamp E; but for vehicles having no springs and provided with a bolster the construction shown in Figs. 3 and 4 is preferred. In this latter device the upper end of the plate $h$ is free, and a clamp G having an eye $p$ engages the plate and is adjustable thereon to accommodate axles of different thicknesses and is secured after having been set upon an axle by a screw $q$. The clamp is provided with a screw-threaded extension $r$ which enters and passes through a slot $s$ in the clamping-plate $l$ and is secured by a nut $t$.

By the use of a supplemental wheel I not only provide for the breaking of a spindle, but should a wheel of the vehicle break, the supplemental wheel can be attached to the end of the axle to which the broken wheel was attached and the vehicle proceed until home or a place for repairs has been reached.

The axle supporting device may be readily carried by securing it to the under side of the body of the vehicle, or by securing it to the reach of the running-gear and thus always be at command to meet any emergency of the kind described.

Having thus fully described my invention, what I claim is—

1. A device for supporting a vehicle axle, consisting of a supplemental wheel, a supporting frame for the wheel and a clip at the upper end thereof provided with a vertically adjustable clamp to secure the frame and the wheel to the axle of a vehicle.

2. A device for supporting a vehicle axle, consisting of a supplemental wheel, a supporting frame for the wheel, a clip at the upper end of the frame provided with an adjustable clamping-plate on one side, and a vertically adjustable clamp, in combination with an axle.

3. A device for supporting a vehicle axle, consisting of a supplemental wheel, a supporting frame for the wheel, a clip provided with a lateral and a vertical clamp, and a block for raising the axle in the clip.

In testimony whereof I affix my signature in presence of two witnesses.

LEVI NEWTON STELY.

Witnesses:
D. C. REINOHL,
H. B. REINOHL.